(12) United States Patent
Li

(10) Patent No.: US 11,212,455 B2
(45) Date of Patent: Dec. 28, 2021

(54) PROCESSING METHOD, APPARATUS, AND ELECTRONIC DEVICE

(71) Applicant: Lenovo (Beijing) Co., Ltd., Beijing (CN)

(72) Inventor: Fanzhi Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 11 days.

(21) Appl. No.: 16/586,301

(22) Filed: Sep. 27, 2019

(65) Prior Publication Data

US 2020/0106943 A1 Apr. 2, 2020

(30) Foreign Application Priority Data

Sep. 30, 2018 (CN) .......................... 201811161326.7

(51) Int. Cl.
*H04N 5/235* (2006.01)
*H04N 5/225* (2006.01)
*H04N 5/353* (2011.01)
*H04N 5/232* (2006.01)
*H04N 5/355* (2011.01)

(52) U.S. Cl.
CPC ................................ *H04N 5/2354* (2013.01)

(58) Field of Classification Search
CPC .... H04N 5/2354; H04N 5/2257; H04N 5/235; H04N 5/353; H04N 5/2356; H04N 5/35581; H04N 5/2352; H04N 5/232935; H04N 1/0264; H04N 1/00161; H04N 1/2145; H04M 1/0264
USPC .......... 348/333.1, 224.1, 371, 208.12, 229.1, 348/362, 221.1; 396/63, 65, 89, 155, 396/161, 166, 167, 180, 213, 215, 61, 396/171, 173, 176–179, 1, 79

See application file for complete search history.

(56) References Cited

U.S. PATENT DOCUMENTS

| | | | |
|---|---|---|---|
| 8,174,611 B2 * | 5/2012 | Estevez | H04N 9/73 348/241 |
| 9,706,096 B2 | 7/2017 | Wu et al. | |
| 10,165,243 B2 * | 12/2018 | Saito | H04N 5/23229 348/224.1 |
| 10,477,087 B2 * | 11/2019 | Rivard | H04N 5/225 |
| 10,645,292 B2 * | 5/2020 | Srivastava | H04N 5/23216 |

(Continued)

FOREIGN PATENT DOCUMENTS

| | | | | |
|---|---|---|---|---|
| CN | 103957363 A | * | 7/2014 | ............. H04N 5/232 |
| CN | 103957363 A | | 7/2014 | |

(Continued)

*Primary Examiner* — Marly S Camargo
(74) *Attorney, Agent, or Firm* — Anova Law Group, PLLC

(57) ABSTRACT

Processing method, processing apparatus, and electronic device are provided. The processing method includes continuously acquiring an image by using an acquisition component and continuously displaying the acquired image by using a display device in response to a first operation; and storing one or more frames of the image by using a storage device in response to a second operation. After the first operation and before storing the one or more frames of the image, there is at least one moment that a first light-emitting component is in an illuminating state and the moment of the first light-emitting component being in the illuminating state is different from a moment that the one or more frames of the image are acquired.

16 Claims, 6 Drawing Sheets

(56) References Cited

U.S. PATENT DOCUMENTS

| | | | | |
|---|---|---|---|---|
| 2006/0204055 A1* | 9/2006 | Steinberg | ............ | H04N 5/23219 |
| | | | | 382/118 |
| 2013/0208149 A1* | 8/2013 | Kamiya | ................ | H04N 5/248 |
| | | | | 348/241 |
| 2017/0054886 A1* | 2/2017 | Chu | ...................... | H04N 9/735 |

FOREIGN PATENT DOCUMENTS

| | | | | | |
|---|---|---|---|---|---|
| CN | 105227823 | A | | 1/2016 | |
| CN | 106713715 | A | * | 5/2017 | ............ H04N 5/2257 |
| CN | 106713715 | A | | 5/2017 | |
| CN | 107818283 | A | | 3/2018 | |
| CN | 107888842 | A | | 4/2018 | |

* cited by examiner

PROCESSING METHOD, APPARATUS, AND ELECTRONIC DEVICE

CROSS-REFERENCES TO RELATED APPLICATION

This application claims priority to Chinese Patent Application No. 201811161326.7, filed on Sep. 30, 2018, the entire content of which is incorporated herein by reference.

FIELD OF TECHNOLOGY

The present disclosure relates to the field of imaging control technology, and more specifically, to a processing method, apparatus, and electronic device.

BACKGROUND

Presently, when a terminal is used to acquire an image, the terminal needs to first prepare for the image acquisition, followed by activating a camera or the like to perform image acquisition, focusing, or any other operations. Subsequently the image may be acquired and stored by flashing of a flash component, when the image needs to be stored.

As such, the conventional image acquisition method requires flashing when imaging is acquired, which may affect the user experience.

BRIEF SUMMARY OF THE DISCLOSURE

One aspect of the present disclosure provides a processing method including: continuously acquiring an image by using an acquisition component and continuously displaying the acquired image by using a display device in response to a first operation; and storing one or more frames of the image by using a storage device in response to a second operation. After the first operation and before storing the one or more frames of the image, there is at least one moment that a first light-emitting component is in an illuminating state and the moment of the first light-emitting component being in the illuminating state is different from a moment that the one or more frames of the image are acquired.

Another aspect of the present disclosure provides a processing apparatus. The processing apparatus includes an image acquisition component configured to continuously acquire an image by using an acquisition component and continuously displaying the acquired image by using a display unit in response to a first operation; and an image storage device configured to store one or more frames of the image by using a storage device in response to a second operation. After the first operation and before storing the one or more frames of the image, there is at least one moment that a first light-emitting component is in an illuminating state and the moment of the first light-emitting component being in the illuminating state is different from a moment that the one or more frames of the image are acquired.

Another aspect of the present disclosure provides an electronic device. The electronic device includes an acquisition component, configured to continuously acquire an image in response to a first operation; a display device, configured to continuously display the image acquired by the acquisition component; a storage device, configured to store one or more frames of the image in response to a second operation; and a first light-emitting component configured at least in one moment to be in an illuminating state after the first operation and before storing the one or more frames of the image, and the moment of the first light-emitting component being in the illuminating state is different from a moment that the one or more frames of the image are acquired Other aspects or embodiments of the present disclosure can be understood by those skilled in the art in light of the description, the claims, and the drawings of the present disclosure.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION

In order to make the objectives, technical solutions, and advantages of the present disclosure more clear, the technical solutions in the embodiments of the present disclosure will be described below with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
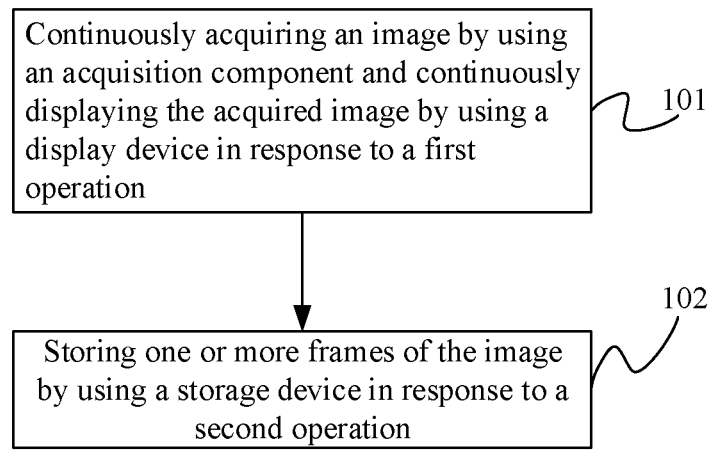
FIG. 1 is a flowchart illustrating a processing method according to some embodiments of the present disclosure.

FIG. 1 is a flowchart illustrating a processing method according to some embodiments of the present disclosure. As shown in FIG. 1, the method may be applied to any electronic device including an image acquisition function. For example, the electronic device may be a mobile phone, a tablet, a camera, or any computing device. The electronic device may include an acquisition component, a display device, a storage device, and a first light-emitting component. The processing method is described in more detail below.

101, continuously acquiring an image by using the acquisition component and continuously displaying the acquired image by using the display device in response to a first operation.

Figure 2:
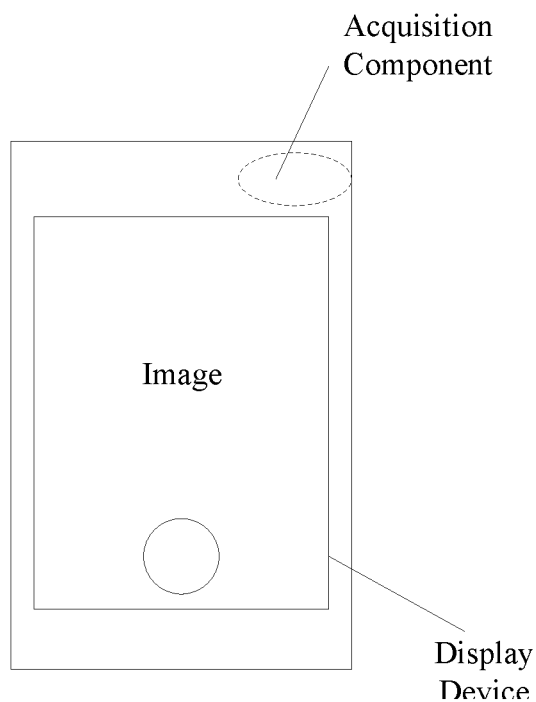
FIG. 2 illustrates an electronic device including an image capturing function according to some embodiments of the present disclosure.

In some embodiments, the acquisition component of the present disclosure may start to continuously acquire an image when triggered by the first operation. The acquired image may be temporarily cashed, and the display device may continuously display the temporarily cached image. Alternatively, the acquisition component may directly transmit the continuously acquired image to the display device for the continuous display when triggered by the first operation. As such, a user may view the image that is continuously previewed during the photographing process in the display device, as shown in FIG. 2.

It should be noted that the first operation in the present embodiment may be an operation caused by a user triggering an operation button corresponding to the acquisition component, such as an operation of driving the power of the acquisition component to start the acquisition component. Alternatively, the first operation may be an operation generated when a current state of the electronic device satisfies a predetermined operating condition. For example, when the current moment of the electronic device meets a predetermined photographing moment, the first operation may be automatically generated or an instruction corresponding to the first operation may be generated to trigger the acquisition component to continuously acquire the image and the display device may continuously display the acquired image.

102, storing one or more frames of the image by using the storage device in response to a second operation.

In some embodiments, the storage device may be used to store one or more frames of the image being continuously displayed by the display device under the second operation. That is, under the second operation, the storage device may store one or more frames of the image corresponding to the second operation.

It should be noted that the second operation in the present embodiment may be an operation caused by a user triggering an operation button corresponding to the display device, or an operation automatically generated by the display device or the electronic device when it is determined that the displayed image satisfies a predetermined storage condition. Alternatively, the second operation may be other triggering operations, such as a triggering operation when a voice recognition or a gesture recognition satisfies a predetermined recognition condition, or a triggering operation when a timer countdown satisfies a predetermined countdown condition.

Figure 3:
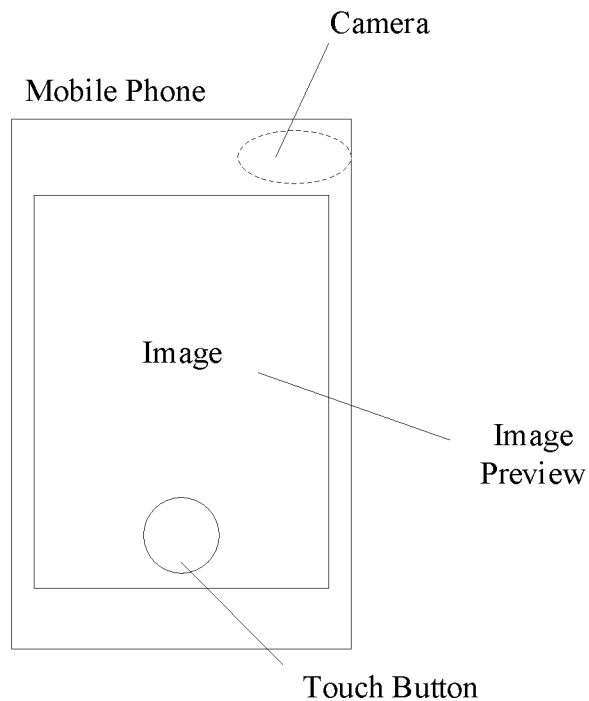
FIG. 3 illustrates a mobile phone including an image capturing function according to some embodiments of the present disclosure.

For example, as shown in FIG. 3, during the process of activating a camera function to activate a camera image preview, the user may click on a touch button of the camera on a mobile phone, and trigger the storage device to store one or more frames of the image corresponding to the clicking operation.

Figure 4:
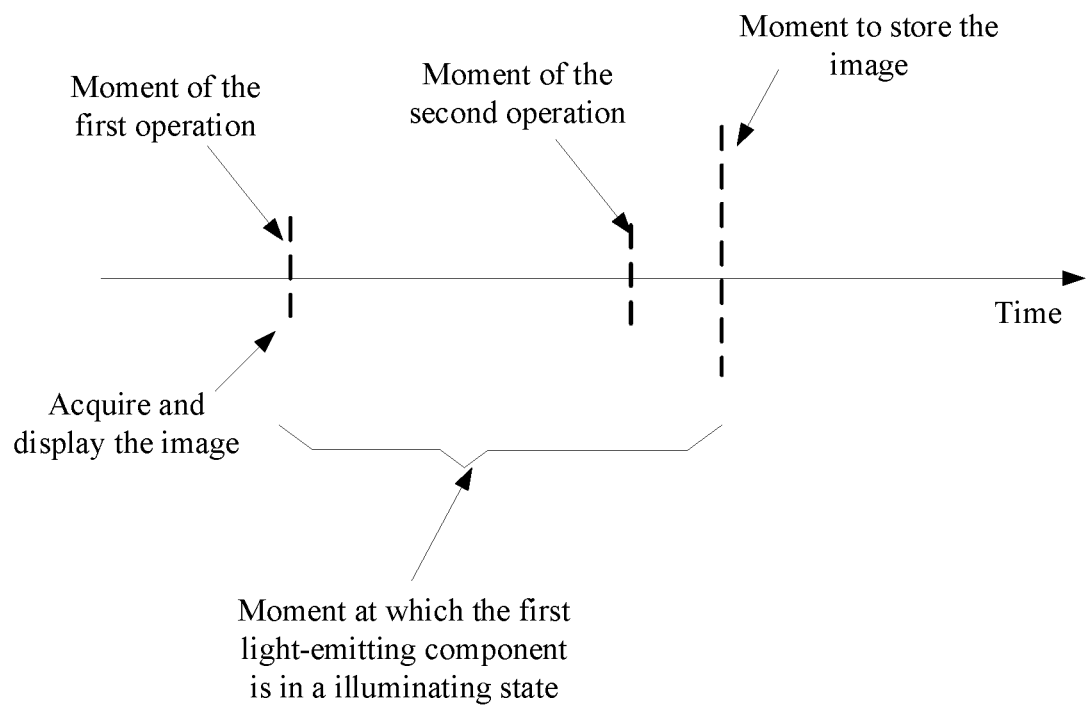
FIG. 4 illustrates a timeline of an image capturing operation according to some embodiments of the present disclosure.

In some embodiments, after the first operation and before the storage device stores the one or more frames of the image, there may be at least a moment at which the first light-emitting component may be in an illuminating state. As shown in FIG. 4, in the process of the first operation and storing the one or more frames of the image, that is, in the process of the acquisition component continuously acquiring the image, and the display device continuously displaying the acquired image and storing the one or more frames of the image, the first light-emitting component may be in the illuminating state at a moment, a plurality of moments, or all moments.

In some embodiments, the moment at which the first light-emitting component is in the illuminating state may be different from the moment at which the one or more frames of the image are acquired. In the present embodiment, the moment at which the one or more frames of the image are acquired may be understood as the moment at which the one or more frames of the image that may need to be stored by the storage device are acquired. For example, in the present embodiment, the one or more frames of the image to be stored by the storage device may be acquired by the storage device, the display device, or other units in the electronic device. As such, in the present embodiment, the moment at which the one or more frames of the image stored by the storage device are acquired may be different from moment at which the storage device stores the one or more frames of the image. Further, the moment at which the one or more frames of the image stored by the storage device are acquired may be before the moment at which the storage device stores the one or more frames of the image, as shown in FIG. 5.

Figure 5:
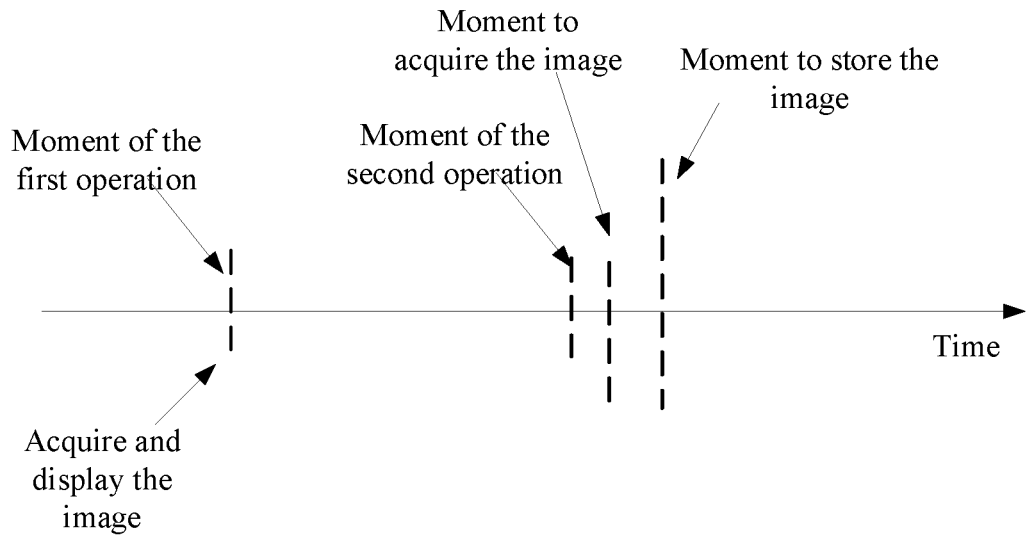
FIG. 5 illustrates another timeline of the image capturing operation according to some embodiments of the present disclosure.

As shown in FIG. 4 and FIG. 5, in some embodiments, in the process of acquiring an image and continuously displaying the image, before the image is stored, rather than illuminating light at a moment when the one or more frames of the image are acquired, there may be a moment, a plurality of moments, or all moments at which the first light-emitting component may be in the illuminating state.

As described in the foregoing technical solution, the embodiments of the present disclosure provides a processing method in which there may be a moment at which the light-emitting component may be in the illuminating state after the first operation to use the acquisition component to continuously acquire an image is triggered, and before the storage device stores the image. As such, the light-emitting component may illuminate light before the image is stored, thereby improving the user experience.

In some embodiments, after acquiring one or more frames of the image, such as when the storage device stores one or more frames of the image and after the storage device stores one or more frames of the image, acquiring the image by using the acquisition component and displaying the acquired image by using the display device may be stopped, and the first light-emitting component may remain in the illuminating state. For example, after acquiring one or more frames of the image, the first light-emitting component may continue to be in the illuminating state, and the acquisition component and the display device may stop performing the corresponding operations, such as stopping the acquisition and display of the image, and stopping the image preview.

Alternatively, in another embodiment, after acquiring one or more frames of the image, such as when the storage device stores one or more frames of the image and after the storage device stores one or more frames of the image, acquiring the image by using the acquisition component and displaying the acquired image by using the display device may continue, and the first light-emitting component may remain in the illuminating state. In some embodiments, after acquiring one or more frames of the image, the first light-emitting component may continue to be in the illuminating state, and the acquisition component and the display device may continue to perform the corresponding operations, such as continuing the acquisition and display of the image, and continuing the image preview.

That is, in some embodiments, the first light-emitting component may be in the illuminating state after the first operation and before storing one or more frames of the image. Further, after acquiring one or more frames of the image, the first light-emitting component may continue to be in the illuminating state regardless of whether the acquisition component continues to acquire images, thereby providing user with a sufficient amount of light to complete the related tasks.

Figure 6:
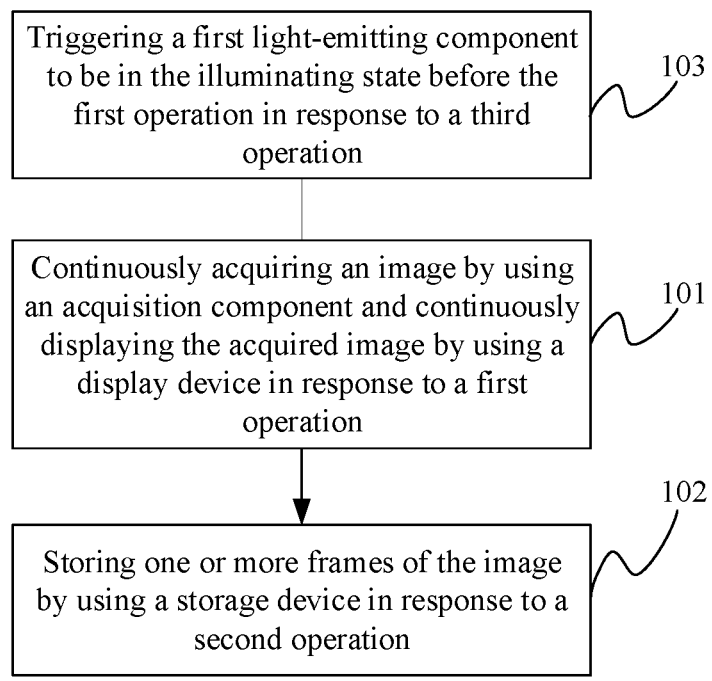
FIG. 6 is a flowchart illustrating another processing method according to some embodiments of the present disclosure.

As shown in FIG. 6, for example, the processing method may further include:

103, triggering the first light-emitting component to be in the illuminating state before the first operation in response to a third operation.

In some embodiments, after the first operation and before storing the one or more frames of the image, the first light-emitting component may continue to be in the illuminating state.

That is, in the present embodiment, the third operation, such as the operation to turn on the flashlight, may be performed before the first operation. As such, under the third operation, the first light-emitting component may be in the illuminating state before the first operation. Further, after the first operation and before storing one or more frames of the image, the first light-emitting component may continue to be in the illuminating state, which is different from flashing at a single moment.

Based on the embodiments described above, there may be a moment at which one or more frames of the image to be stored are acquired during the moment that is after the first operation and before storing one or more frames of the image. At this point, whether the first light-emitting component is in the illuminating state may be determined based on the degree of exposure of the image displayed by the display device. For example, under the third operation, the first light-emitting component may be in the illuminating state, and the emitted light of the first light-emitting component may be used for illumination. The illumination of the first light-emitting component may continue until the first operation. At this point, the acquisition component may begin to acquire an image and display the acquired image on the display device. Before one or more frames of the image to be stored are acquired, the first light-emitting component may continue to be in the illuminating state to provide illumination and lighting for the image acquisition environment, thereby improving the lighting of the image acquisition environment. Subsequently, one or more frames of the image to be stored may be acquired under the second operation, and the corresponding storage device may store one or more frames of the image. In this process, in the present embodiment, an exposure parameter of the image displayed by the display device may be acquired and analyzed to determine whether the image is underexposed or overexposed. When the image is underexposed, the first light-emitting component may be triggered to emit light at the moment of acquiring the one or more frames of the image to be stored and continue to be in the illuminating state after acquiring the one or more frames of the image to be stored to achieve the purpose of filling the image. When the image is overexposed, the first light-emitting component may be triggered to stop emitting light at the moment of acquiring the one or more frames of the image to be stored to improve the lighting of the image acquisition environment. In order to achieve the purpose of flashlight illumination, the first light-emitting component may continue to be in the illuminating state after the moment at which the one or more frames of the image to be stored are acquired.

In some embodiments, the first light-emitting component may be a unit disposed on a first device configured to perform the technical solutions provided in the embodiments of the present disclosure. That is, the first device may include a first light-emitting component. The first light-emitting component may cooperate with the acquisition component, the display device, the storage device, etc. such that the first device may acquire one or more frames of the image and store one or more frames of the image by using the storage device.

Correspondingly, the light of the first light-emitting component in the illuminating state may be used to trigger a light-emitting component of a second device to be in an illuminating state at the moment of acquiring the one or more frames of the image.

In some embodiments, the first light-emitting component may be in an illuminating state before storing the one or more frames of the image after the first operation. In this process, in the present embodiment, an exposure parameter of the image displayed by the display device may be acquired and analyzed to determine whether the image is underexposed or overexposed. When the image is underexposed, the first light-emitting component may be triggered to emit light at the moment of acquiring the one or more frames of the image to be stored to achieve the purpose of filling the image. Further, in the present embodiment, in order to further fill the image to make the image exposure as suitable as possible, other light-emitting components may be triggered by the light of the first light-emitting component to enter the illuminating state at the moment of acquiring the one or more frames of the image. For example, the light of the first light-emitting component may trigger a second light-emitting component of the second device to be in the illuminating state at the moment of the first device acquiring the one or more frames of the image. As such, the one or more frames of the image may be filled with light, thereby improving the image imaging effect.

In some embodiments, the light of the first light-emitting component in the illuminating state may be used to trigger the second light-emitting component to be in the illuminating state with a target illumination parameter. That is, in some embodiments, the target illumination parameter of the second light-emitting component may be transmitted to the second light-emitting component by the light of the first light-emitting component. For example, the light of the first light-emitting component in the illuminating state may include a target illumination parameter to trigger the second light-emitting component to be in an illumination state based on the target illumination parameter in the light after receiving the light of the first light-emitting component. Further, the target illumination parameter may be determined in a plurality of candidate illumination parameters generated based on the image exposure parameter of the image and the illumination parameter of the first light-emitting component.

In some embodiments, in order to further fill the image to make the image exposure parameter as suitable as possible, the current illumination parameter of the image may be analyzed and combined with the illumination parameters of the first light-emitting component, such as an illumination brightness, illumination hue, and illumination direction, to generate a plurality of candidate illumination parameters. As such, when the image is underexposed, a suitable illumination parameter may be determined from the candidate illumination parameters, including a target brightness parameter, a target hue parameter, a target color temperature parameter, or an illumination direction parameter, etc. Subsequently, the target illumination parameter may be transmitted to the second light-emitting component of the second device through the light of the first light-emitting component, thereby enabling the second light-emitting component to be in the illuminating state with the target illumination parameter. For example, the second light-emitting component may be a lighting unit, etc. in a lighting device. The second light-emitting component may emit light in a red hue with a brightness of 50 cd/m$^2$ and a direction at an angle of 90° with the light of the first light-emitting component, thereby ensuring the light of the first light-emitting component and the second first light-emitting component may fill the image at the moment when one or more frames of the image are acquired. As such, the image may be supplemented with red light to improve the image imaging effect.

In another example, the second light-emitting component may be a flash on a mobile terminal. The second light-emitting component may be a combination of yellow and white flash, which may be used to improve the white balance of the light in a camera by adjusting the parameters of the yellow light and the white light to support a variety of different color temperatures. In some embodiments, the second light-emitting component may emit light with a yellow hue and a corresponding color temperature parameter, and a brightness of 60 cd/m$^2$, thereby ensuring the light of the first light-emitting component and the second first light-emitting component may fill the image at the moment when one or more frames of the image are acquired. As such, the image may be supplemented with yellow light to improve the image imaging effect.

In some embodiments, the second light-emitting component may be triggered to be in the illuminating state before acquiring the one or more frames of the image by the transmission of the light of the first light-emitting component or other signals. As such, before acquiring the one or more frames of the image, the first light-emitting component and the second light-emitting component may serve the purpose of illuminating or improving the lighting of the image acquisition environment. At the moment when the one or more frames of the image are acquired, the first light-emitting component and the second light-emitting component may be combined to fill the image, thereby avoiding the situation where the image may be underexposed and improving the image imaging effect.

In some embodiments, at the moment when the one or more frames of the image are acquired, the first light-emitting component may be in an illuminating state. That is, the first light-emitting component may emit light to provide the exposure brightness (e.g., a photo flash) to acquire the one or more frames of the image, thereby improving the exposure quality of the image and the image imaging effect.

Correspondingly, the one or more frames of the image in the present embodiment may be a frame of image, a plurality of frames of image, or video data composed of consecutive frames of images.

In some embodiments, the first light-emitting component may flash at the moment when one or more frames of the image are acquired. For example, the flash may not only be in a state of flashing or continuously illuminating to provide illumination for the image preview and improving the image preview effect before storing a frame of image and after the operation to activate the camera function. The flash may also flash at the moment of acquiring the frame of image, thereby improving the image exposure state and the image imaging effect.

In some embodiments, the first light-emitting component may flash at the moment when each frame of the plurality of frames of image is acquired. For example, the flash may not only be in a state of flashing or continuously illuminating to provide illumination for the image preview and improving the image preview effect before storing a frame of image and after the operation to activate the camera function. The flash may flash at the moment of acquiring each frame of image. That is, the exposure state of each frame of image may be improved by multiple flashes, thereby improving the image imaging effect.

In some embodiments, the first light-emitting component may continue to be in an illuminating state for a short period of time in which the video data composed of a consecutive frames of images is acquired. For example, the flash may not only be in a state of flashing or continuously illuminating to provide illumination for the image preview and improving the image preview effect before storing a frame of image and after the operation to activate the camera function. The flash may also continue to be in the illuminating state during the process from acquiring a first frame of the image to the last frame of the image of the video data in the process of acquiring the video data. As such, the lighting in the video data may be sufficient, and the exposure state of each frame of the video data may be improved, thereby improving the image imaging effect.

In some embodiments, the first light-emitting component may not be in an illuminating state at the moment when one or more frames of the image are acquired.

In some embodiments, before acquiring the one or more frames of the image, the current exposure parameter of the image displayed by the display device may be acquired and analyzed to determine whether the exposure quality of the image satisfies a most suitable imaging condition, for example, whether the exposure is suitable, underexposed, overexposed, etc., thereby determining whether the first light-emitting component may be in an illuminating state when the one or more frames of the image are acquired.

For example, in response to determining that the image displayed by the display device is overexposed before acquiring the one or more frames of the image, the first light-emitting component may be triggered to stop being in the illuminating state when the one or more frames of the image are acquired, thereby avoiding overexposure and improving the image imaging effect.

Further, in response to determining that the image exposure is suitable, then whether the first illumination device may continue to be in the illuminating state may be determined based on whether the first light-emitting component is in the illuminating state at the moment when the image is acquired with the suitable exposure. For example, when the first light-emitting component is in the illuminating state at the acquisition moment of the image with the suitable exposure, the first light-emitting component may also be in the illuminating state when the one or more frames of the image are acquired. Further, when the first light-emitting component is not in the illuminating state at the acquisition moment of the image with the suitable exposure, the first light-emitting component may also not be in the illuminating state when the one or more frames of the image are acquired, such that the acquired one or more frames of the image may have the same suitable exposure.

That is, In some embodiments, before acquiring the one or more frames of the image to be stored, the first light-emitting component may be in the illuminating state. At the moment of acquiring the one or more frames of the image, whether the first light-emitting component continues to be in the illuminating state may depend on whether the exposure quality of the image display by the display device before the moment when the one or more frames of the image are acquired satisfies a suitable imaging condition. When the suitable imaging condition is satisfied, that is, the exposure is suitable, the first light-emitting component may remain to be in the continuously illuminating state. Further, when the exposure quality of the image has been overexposed, then the first light-emitting component may be trigger to exit the illuminating state. That is, in the present embodiment, instead of determining whether to trigger the first light-emitting component to enter the illuminating state from the unilluminating state, the determination of whether the first light-emitting component should remain to be in the illuminating state or triggered to exit the illuminating state may be based on the image exposure quality, which is obviously different from the technical solution of determining whether to trigger the flash to turn on the light based on the exposure quality of the image when the camera captures an image.

In addition, when the exposure quality of the image is underexposed, the first light-emitting component may be triggered to be in the illuminating state at the moment of acquiring the one or more frames of the image, such that the light of the acquired one or more frames of the image may be filled, thereby avoiding an insufficient light exposure. Further, the light of the first light-emitting component may be used to trigger the light-emitting component of the second device to be in the illuminating state at the moment of acquiring the one or more frames of the image, thereby cooperating more light-emitting components to fill the light of the image to improve the image imaging effect.

Furthermore, at the moment after the moment at which the one or more frames of the image are acquired, the first light-emitting component may continue to be in the illuminating state or exit the illuminating state.

In some embodiments, the electronic device of the present disclosure may include two or more applications, such as a first application, a second application, and other applications. The first application may be used to implement a first function based on the first light-emitting component, for example, a flashlight application may use a flash to implement a flashlight function. The second application may be used to implement a second function based on the first light-emitting component, for example, an imaging application may use the flash to implement a light filling function. Based on the embodiments of the present disclosure, the first application and the second application may both use the first light-emitting component.

For example, in the process in which the first application is using the first light-emitting component to perform the first function, the second application may implement the second function by using the first light-emitting component. After the second application completes the second function by using the first light-emitting component, the first application may continue to implement the first function by using the first light-emitting component.

Alternatively, in the process in which the second application is using the first light-emitting component to perform the second function, the first application may implement the first function by using the first light-emitting component. After the second application completes the second function by using the first light-emitting component, the first application may continue to implement the first function by using the first light-emitting component, or the first application may end the use of the first function.

For example, in the process of using the flashlight application to turn on the flash to perform the flashlight function, a user may turn on the camera to capture an image. The camera may use the flash to fill the light when capturing the image or previewing the image. As such, the flash may continue to be in an activated state. After the camera finishes capturing the image, the flashlight application may keep the flash to be the activated state to provide illumination, or the flashlight application may be turned off the flash to stop providing illumination.

In another example, when the user turns on the camera, the user may use the flash to fill the image with light. After the flash is turned on, the flashlight application may use the flashing flash to perform the flashlight function without affecting the image capturing function of the camera. After the camera finishes capturing the image, the flashlight application may keep the flash to be the activated state to perform the flashlight function, or the flashlight application may turn off the flash to stop performing the flashlight function.

In some embodiments, there are two or more modes may be used such that the first light-emitting component may be in the illuminating state after the first operation and before storing the one or more frames of the image. For example, the embodiments of the present disclosure may be implemented by using at least a first mode and a second mode.

For example, in the first mode and the second mode, the first light-emitting component may be placed under the illuminating state after the first operation and before storing the one or more frames of the image. In these different modes, the use of light of the corresponding first light-emitting component may be different, or the triggering moment or triggering operation of the first light-emitting component may be different.

For example, in the first mode, the light of the first light-emitting component in the illuminating state after the first operation and before storing the one or more frames of the image may be used for a first purpose or a first function. In the second mode, the light of the first light-emitting component in the illuminating state after the first operation and before storing the one or more frames of the image may be used for a second purpose or a second function.

For example, in the first mode, the light of the first light-emitting component in the illuminating state may be used to provide illumination for the image acquisition environment. As such, the lighting in the image acquisition environment and the image preview effect during the image preview may be improved, thereby improving the user experience with the image preview. Further, in the present embodiment, the image capturing effect at the image acquisition moment may be presented in the image preview process. As such, the user may perform the corresponding composition adjustment and the like through the image preview effect, thereby improving the final image imaging effect.

In the second mode, the light of the first light-emitting component in the illuminating state may be used to transmit the corresponding parameters as an optical signal to notify other devices or units to perform the corresponding actions. As such, the control of the coordination between devices may be achieved through the optical signal transmission for a synchronous operation, thereby improving the coordination efficiency and the accuracy of the synchronous coordination while reducing the complexity of the synchronization process, thus improving the synchronous coordination experience. For example, during the image capturing process, the flashlight may flash and carry optical parameters such as the hue, the brightness, and the direction of the light to notify other light-emitting components to emit light with the corresponding optical parameters at a specific time, thereby supplementing the corresponding light for the image capture.

For example, the light of the first light-emitting component may be visible light, such as a first light-emitting component including a combination of yellow and white flashlights. As such, in the present embodiment, it may not be necessary to provide other advanced light-emitting components, such as an infrared light-emitting component or a laser unit, to emit light, and the transmission of the optical signal may be implemented by using the existing light-emitting component in the electronic device. Therefore, the structural complexity and operational complexity of the electronic device may be reduced, thereby improving the user experience and protecting the user's eyes to certain extent to avoid injuries.

In some embodiments, the first light-emitting component in the first mode may be triggered to be in the illuminating state at some points before the first operation. Further, the first light-emitting component in the second mode may be triggered to be in the illuminating state after the first operation and before storing the one or more frames of the image.

For example, the first light-emitting component in the first mode may be triggered at a certain point in time before the acquisition of an image (e.g., the first operation) by an acquisition component, such that the first light-emitting component may be in the illuminating state after the first operation and before storing the one or more frames of the image. Further, the light of the first light-emitting component in the illuminating state may be for illumination in the first mode. For example, the first light-emitting component may be in the illuminating state before the first operation, and emit light as a flashlight to provide light for the user to find an article. Further, after the acquisition component starts to acquire an image, the light of the first light-emitting component may be used to provide illumination for the image acquisition environment to improve the lighting of the image acquisition environment. As such, in the present embodiment, the first light-emitting component may be activated and in the illuminating state before the acquisition component, such as a camera, is activated. While the first light-emitting component is in the illuminating state, the acquisition component, display device, and storage device may be activated and used to for capturing and storing an image without the need to turn the first light-emitting component off and on again. Therefore, the illumination state of the first light-emitting component may not change, and the light of the first light-emitting component may be used as flash to provide light for the image capture while being used as a flashlight, thereby reducing the multiple switching operations of the first light-emitting component. As such, the service life of the first light-emitting component may be extended and the user experience of acquiring and storing the image may be improved.

In some embodiments, the first light-emitting component may be triggered in the second mode after the first operation and at a point in time before storing the one or more frames of the image to enter the illuminating state. Further, the light of the first light-emitting component in the illuminating state in the second mode may be used as an optical signal carrying the corresponding parameters to notify other devices or unit to perform the corresponding actions.

In some embodiments, the first light-emitting component in the first mode may be triggered to be in the illuminating state by the first operation or an operation before the first operation. Further, the first light-emitting component in the second mode may be triggered to be in the illuminating state by the second operation or an operation after the first operation and before storing the one or more frames of the image.

For example, the first light-emitting component in the first mode may be triggered by the first operation to be in the illuminating state after the first operation and before storing the one or more frames of image. Further, the light of the first light-emitting component in the illuminating state in the first mode may be used to provide illumination for the image acquisition environment, thereby improving the lighting of the image acquisition environment.

In addition, the first light-emitting component in the second mode may be triggered by the second operation to enter the illuminating state. Further, the light of the first light-emitting component in the illuminating state in the second mode may be used as an optical signal carrying the corresponding parameters to notify other devices or unit to perform the corresponding actions.

It should be noted that in the present embodiment, the user may configure the first light-emitting component based on the requirements. As such, the first light-emitting component may be in the illuminating state at a moment after the first operation and before storing the one or more frames of the image in two or more different modes, instead of only being in the illuminating state when providing the flash for the image acquisition. Therefore, in the present embodiment, the user may have a better user experience, thereby meeting the corresponding functional requirements, such as the flashlight function, the image capturing function, and the signal transmission function.

Figure 7:
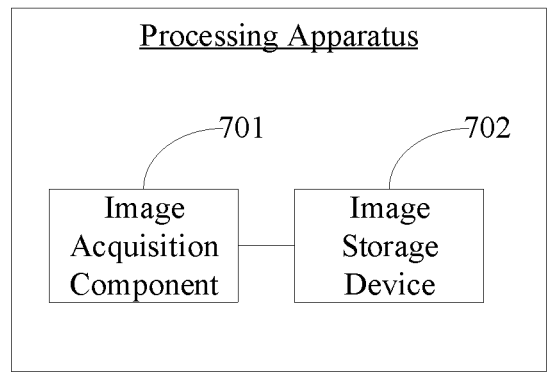
FIGS. 7-9 are structural diagrams of examples of a processing apparatus according some embodiments of the present disclosure.

FIG. 7 is a structural diagram of a processing apparatus according some embodiments of the present disclosure. As shown in FIG. 7, the processing apparatus may be disposed in an electronic device, including an image acquisition function, such as a mobile phone, a tablet, or a camera, and the electronic device may include an acquisition component, a display device, a storage device, and a first light-emitting component. Further, the processing apparatus may include the following structural units.

An image acquisition component 701, which may be configured to continuously acquire an image by using the acquisition component and continuously displaying the acquired image by using the display device in response to a first operation.

In some embodiments, the acquisition component of the present disclosure may start to continuously acquire an image when triggered by the first operation. The acquired image may be temporarily cashed, and the display device may continuously display the temporarily cached image. Alternatively, the acquisition component may directly transmit the continuously acquired image to the display device for the continuous display when triggered by the first operation. As such, a user may view the image that is continuously previewed during the photographing process in the display device, as shown in FIG. 2.

It should be noted that the first operation in the present embodiment may be an operation caused by a user triggering an operation button corresponding to the acquisition component, such as an operation of driving the power of the acquisition component to start the acquisition component. Alternatively, the first operation may be an operation generated when a current state of the electronic device satisfies a predetermined operating condition. For example, when the current moment of the electronic device meets a predetermined photographing moment, the first operation may be automatically generated or an instruction corresponding to the first operation may be generated to trigger the acquisition component to continuously acquire the image and the display device may continuously display the acquired image.

An image storage device 702, which may be configured to store one or more frames of the image by using the storage device in response to a second operation.

In some embodiments, the storage device may be used to store one or more frames of the image being continuously displayed by the display device under the second operation. That is, under the second operation, the storage device may store one or more frames of the image corresponding to the second operation.

It should be noted that the second operation in the present embodiment may be an operation caused by a user triggering an operation button corresponding to the display device, or an operation automatically generated by the display device or the electronic device when it is determined that the displayed image satisfies a predetermined storage condition. Alternatively, the second operation may be other triggering operations, such as a triggering operation when a voice recognition or a gesture recognition satisfies a predetermined recognition condition, or a triggering operation when a timer countdown satisfies a predetermined countdown condition.

For example, as shown in FIG. 3, during the process of turning on a camera function to activate a camera preview image, the user may click on a touch button of the camera on a mobile phone, and trigger the storage device to store one or more frames of the image corresponding to the clicking operation.

In some embodiments, after the first operation and before the storage device stores the one or more frames of the image, there may be at least a moment at which the first light-emitting component may be in an illuminating state. As shown in FIG. 4, in the process of the first operation and storing the one or more frames of the image, that is, in the process of the acquisition component continuously acquiring the image, and the display device continuously displaying the acquired image and storing the one or more frames of the image, the first light-emitting component may be in the illuminating state at a moment, a plurality of moments, or all moments.

In some embodiments, the moment at which the first light-emitting component is in the illuminating state may be different from the moment at which the one or more frames of the image are acquired. In the present embodiment, the moment at which the one or more frames of the image are acquired may be understood as moment at which one or more frames of the image that may need to be stored by the storage device is acquired. For example, in the present embodiment, the one or more frames of the image to be stored by the storage device may be acquired by the storage device, the display device, or other units in the electronic device. As such, in the present embodiment, the moment at which the one or more frames of the image stored by the storage device is acquired may be different from the moment at which the storage device stores the one or more frames of the image. Further, the moment at which the one or more frames of the image stored by the storage device is acquired may be before the moment at which the storage device stores the one or more frames of the image, as shown in FIG. 5.

As shown in FIG. 4 and FIG. 5, in the process of acquiring an image and continuously displaying the image, before the image is stored, rather than illuminating light at a time when the one or more frames of the image are acquired, there may be a moment, a plurality of moments, or all moments at which the first light-emitting component may be in the illuminating state.

Embodiments of the present disclosure may be implemented by using at least a first mode and a second mode. Both modes may cause the first light-emitting component to be in the illuminating state after the first operation and before storing the one or more frames of the image.

In addition, the use of light of the first mode and the second mode may be different, or the triggering moment or the triggering operation of the first mode and the second mode may be different.

In some embodiments, after acquiring the one or more frames of the image, the acquisition of the image by using the acquisition component and the display of the acquired image by using the display device may be stopped, or the continuous acquisition of the image by using the acquisition component and the continuous display of the acquired image by using the display device may be continued; and the first light-emitting component may continue to be in the illuminating state.

In some embodiments, the first light-emitting component may be in the illuminating state at a moment when the one or more frames of the image are acquired; or, the first light-emitting component may not be in the illuminating state at a moment when one or more frames of the image are acquired.

Figure 8:
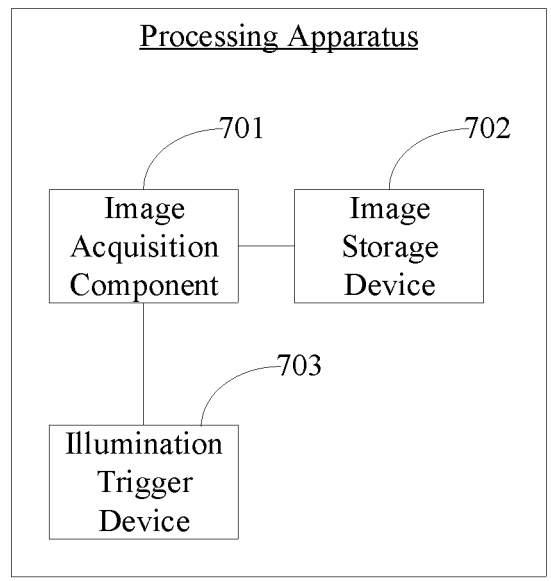

As shown in FIG. 8, in some embodiments, the processing apparatus may further include an illumination trigger device 703, which may be configured to trigger the first light-emitting component to be in the illuminating state before the first operation in response to a third operation.

In some embodiments, after the first operation and before storing the one or more frames of the image, the first light-emitting component may continue to be in the illuminating state.

In some embodiments, the processing apparatus of the present disclosure may be disposed in a first device, which may include a first light-emitting component. The light of the first light-emitting component in the illuminating state may be used to trigger a second light-emitting component of a second device to be in the illuminating state at the moment when the one or more frames of the image are acquired.

Figure 9:
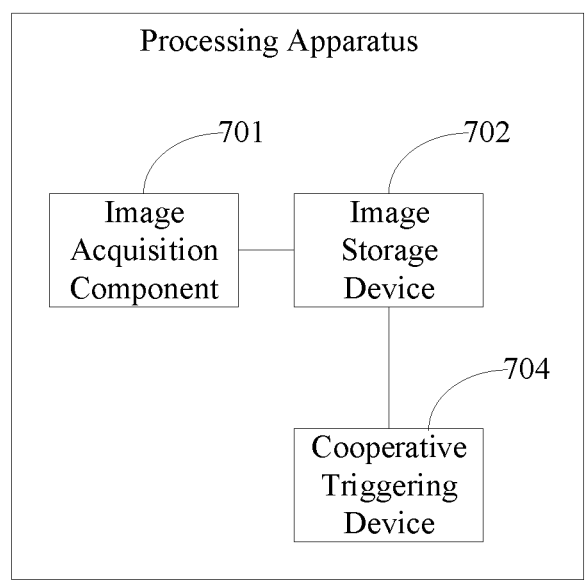

As shown in FIG. 9, in some embodiments, the processing apparatus may further include a cooperative triggering device 704, which may be configured to trigger the second light-emitting component to be in the illuminating state before the one or more frames of the image are acquired.

For example, the light of the first light-emitting component in the illuminating state may be used to trigger the second light-emitting component to be in the illuminating state with a target illumination parameter. Further, the target illumination parameter may be determined in a plurality of candidate illumination parameters generated based on the image exposure parameter of the image and the illumination parameter of the first light-emitting component.

As described in the foregoing technical solution, the embodiments of the present disclosure provides a processing apparatus in which there may be a moment at which the first light-emitting component may be in the illuminating state after the first operation to use the acquisition component to continuously acquire an image is triggered, and before the storage device stores the image. As such, the light-emitting component may be emitting light before the image is stored to improve the lighting environment before an image is capture and to improve the final image imaging effect, thereby improving the user experience.

It should be noted that for details of the specific implementation of the processing apparatus of the present embodiment, reference may be made to the foregoing FIGS. 1-6 and the related contents, which will not be described in detail again.

Figure 10:
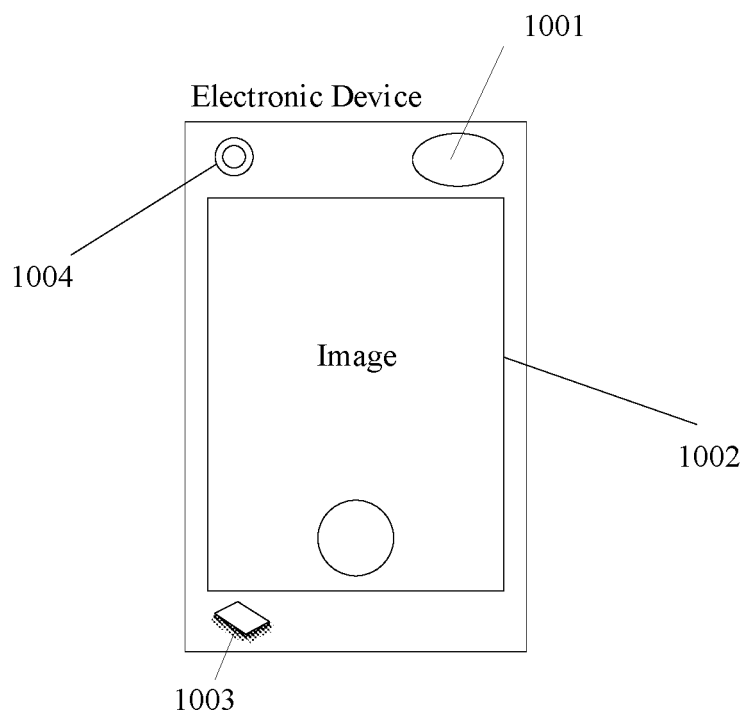
FIG. 10 is a structural diagram of an electronic device according to some embodiments of the present disclosure.

FIG. 10 is a structural diagram of an electronic device according to some embodiments of the present disclosure. The electronic device may be disposed in an electronic device including an image acquisition function, such as a mobile phone, a tablet, or a camera. Further, the electronic device may include the following structural units.

An acquisition component 1001, which may be configured to continuously acquire an image in response to a first operation.

In some embodiments, the acquisition component 1001 may be a unit such as a camera, and the acquisition component 1001 may be disposed on the front and rear side of the electronic device to continuously acquire images in front of or behind the electronic device.

A display device 1002, which may be configured to continuously display the image acquired by the acquisition component 1001.

In some embodiments, the display device 1002 may be implemented by a display screen or a touch screen. The acquisition component 1001 of the present disclosure may start to continuously acquire an image when triggered by the first operation. The acquired image may be temporarily cashed, and the display device 1002 may continuously display the temporarily cached image. Alternatively, the acquisition component 1001 may directly transmit the continuously acquired image to the display device 1002 for the continuous display when triggered by the first operation. As such, a user may view the image that is continuously previewed during the photographing process in the display device 1002.

It should be noted that the first operation in the present embodiment may be an operation caused by a user triggering an operation button corresponding to the acquisition component 1001, such as an operation of driving the power of the acquisition component 1001 to start the acquisition component 1001. Alternatively, the first operation may be an operation generated when a current state of the electronic device satisfies a predetermined operating condition. For example, when the current moment of the electronic device meets a predetermined photographing moment, the first operation may be automatically generated or an instruction corresponding to the first operation may be generated to trigger the acquisition component 1001 to continuously acquire the image and the display device 1002 may continuously display the acquired image.

A storage device 1003, which may be configured to store one or more frames of the image in response to a second operation. In some embodiments, the storage device 1003 may be disposed inside the electronic device for storing the one or more frames of the image of the image continuously displayed by the display device 1002 in the second operation. That is, in the second operation, the storage device 1003 may store the one or more frames of the image corresponding to the second operation.

It should be noted that the second operation in the present embodiment may be an operation caused by a user triggering an operation button corresponding to the storage device 1003, or an operation automatically generated by the display device 1002 or the electronic device when it is determined that the displayed image satisfies a predetermined storage condition. Alternatively, the second operation may be other triggering operations, such as a triggering operation when a voice recognition or a gesture recognition satisfies a predetermined recognition condition, or a triggering operation when a timer countdown satisfies a predetermined countdown condition.

For example, during the process of turning on a camera function to activate a camera preview image, the user may click on a touch button of the camera on a mobile phone, and trigger the storage device 1003 to store the one or more frames of the image corresponding to the clicking operation.

A first light-emitting component 1004, which may be configured to include at least a moment at which the first light-emitting component may be in an illuminating state after the first operation and before the storage device 1003 stores the one or more frames of the image. Further, the moment in which the first light-emitting component 1004 may be in the illuminating state may be different from the moment at which the storage device 1003 acquires the one or more frames of the image.

In some embodiments, the first light-emitting component 1004 may be implemented as a unit such as a flashlight.

That is, in the process of the first operation and storing the one or more frames of the image, that is, in the process of the acquisition component 1001 continuously acquiring the image, and the display device 1002 continuously displaying the acquired image and storing the one or more frames of the image, the first light-emitting component 1004 may be in the illuminating state at a moment, a plurality of moments, or all moments.

In some embodiments, the moment at which the first light-emitting component 1004 is in the illuminating state may be different from the moment at which the one or more frames of the image are acquired. In the present embodiment, the moment at which the one or more frames of the image are acquired may be understood as the moment at which the one or more frames of the image that may need to be stored by the storage device 1003 is acquired. For example, in the present embodiment, the one or more frames of the image to be stored by the storage device 1003 may be acquired by the storage device 1003, the display device 1002, or other units in the electronic device. As such, in the present embodiment, the moment at which the one or more frames of the image stored by the storage device 1003 is acquired may be different from the moment at which the storage device 1003 stores the one or more frames of the image. Further, the moment at which the one or more frames of the image stored by the storage device 1003 is acquired may be before the moment at which the storage device 1003 stores the one or more frames of the image, as shown in FIG. 5.

As shown in FIG. 4 and FIG. 5, in some embodiments, in the process of acquiring an image and continuously displaying the image, before the image is stored, rather than illuminating light at a moment when the one or more frames of the image are acquired, there may be a moment, a plurality of moments, or all moments at which the first light-emitting component 1004 may be in the illuminating state.

As described in the foregoing technical solution, the embodiments of the present disclosure provides an electronic device in which there may be a moment at which the first light-emitting component may be in the illuminating state after the first operation to use the acquisition component to continuously acquire an image is triggered, and before the storage device stores the image. As such, the light-emitting component may be emitting light before the image is stored, thereby improving the user experience.

Embodiments of the present disclosure may be implemented by using at least a first mode and a second mode. Both modes may cause the first light-emitting component 1004 to be in the illuminating state after the first operation and before storing the one or more frames of the image. In addition, the use of light of the first mode and the second mode may be different, or the triggering moment or the triggering operation of the first mode and the second mode may be different.

In some embodiments, after the storage device 1003 acquires the one or more frames of the image, the acquisition of the image by using the acquisition component 1001 and the display of the acquired image by using the display device 1002 may be stopped, or the continuous acquisition of the image by using the acquisition component 1001 and the continuous display of the acquired image by using the display device 1002 may be continued; and the first light-emitting component 1004 may continue to be in the illuminating state.

In some embodiments, the first light-emitting component may be in the illuminating state at a moment when the storage device acquires the one or more frames of the image; or, the first light-emitting component may not be in the illuminating state at a moment when the one or more frames of the image are acquired.

In some embodiments, the first light-emitting component 1004 may be in the illuminating state before the first operation in response to a third operation. Further, the first light-emitting component 1004 may continue to be in the illuminating state after the first operation and before storing the one or more frames of the image.

Figure 11:
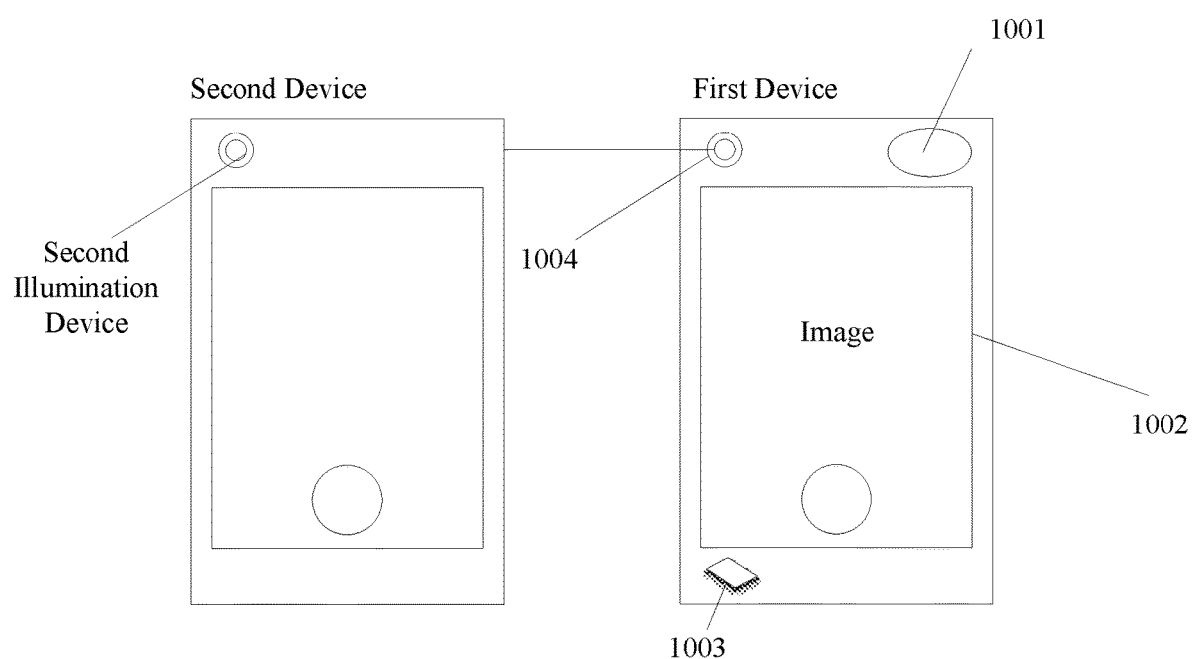
FIG. 11 illustrates a device according to some embodiments of the present disclosure.

In some embodiments, the electronic device may include the first light-emitting component 1004 as a first device. Correspondingly, as shown in FIG. 11, the light of the first light-emitting component 1004 when it is in the illuminating state may be used to trigger a second light-emitting component of a second device to be in the illuminating state at the moment when the one or more frames of the image are acquired.

In some embodiments, the second light-emitting component may also be in the illuminating state before the one or more frames of the image are acquired.

For example, the light of the first light-emitting component 1004 in the illuminating state may be used to trigger the second light-emitting component to be in the illuminating state with a target illumination parameter. Further, the target illumination parameter may be determined in a plurality of candidate illumination parameters generated based on the image exposure parameter of the image and the illumination parameter of the first light-emitting component 1004.

It should be noted that for details of the specific implementation of the electronic device of the present embodiment, reference may be made to the foregoing FIGS. 1-6 and the related contents, which will not be described in detail again.

An implementation method of some embodiments of the present disclosure will be described below by taking the first device as a main camera phone and the second device as an auxiliary camera phone as an example.

The main camera phone may include a flash to implement functions such as the flashlight or the phone flash. Before capturing an image, a user may activate the flash by clicking a flashlight function button to provide illumination for the user.

The user may start the camera to preview the image on a display interface of the main camera phone by clicking on a camera icon on the main camera phone. At this point, the flash may continue to illuminate to provide illumination to the user for the image preview. Alternatively, the flash may flash light to provide user with a focusing light, or the flash may stop to illuminate.

The user may click on a camera button on the image preview interface, and the main camera phone may acquire the corresponding image in response to the clicking operation and store the image in a memory of the main camera phone. After the user clicks on the camera button, when the main camera phone acquire the image, the main camera phone may be configured to determine whether to acquire light for the image through flashing the flash based on the degree of the image exposure in the image preview interface, thereby avoiding situations of underexposure or overexposure. For example, when the image in the image preview interface is underexposed, the flash may be used to supplement light at the moment when the main camera phone acquires the image. Further, when the image in the image preview interface is overexposed, the flash may not flash at the moment when the main camera phone acquires the image, thereby avoiding overexposure and affecting the imaging effect.

In addition, the main camera phone may transmit a signal to the auxiliary camera phone before the moment at which the image is acquired. The signal may be a wireless signal, a voice signal, a flash signal of the flash, etc. The auxiliary camera phone may be notified to emit light before the moment at which the image is acquired and/or at the moment at which the image is acquired, thereby obtaining light to supplement the image preview and the image, and avoiding underexposure.

For example, the main camera phone may signal information such as the illumination moment, the illumination parameters, etc. to the auxiliary camera phone. Further, the image capture and storage may be completed by the main camera phone. Alternatively, the auxiliary camera phone may also perform the image capture and storage simultaneously under the trigger of the main camera phone.

It should be noted that the flash of the main camera phone may flash at a low power rate between the moments when the image is acquired for the main camera phone to perform photometry. As such, the flash may illuminate with the suitable flash parameters under the control of the main camera phone at the moment of acquiring the image. Further, it may be possible to cooperate with the auxiliary camera phone to simultaneously emit light with the suitable flash parameters to satisfy the light requirements of the image and avoid image underexposure.

The embodiments in this specification are described in a progressive manner, each embodiment emphasizes a difference from the other embodiments, and the identical or similar parts between the embodiments may be made reference to each other. Since the apparatus and electronic device disclosed in the embodiments are corresponding to the methods disclosed in the embodiments, the descriptions of the apparatus and electronic device are simple and relevant parts may be made reference to the description of the methods.

Those skilled in the art can recognize that the combination of units and algorithmic steps of each example described in the embodiments of the present disclosure may be realized by electronic hardware, computer software or a combination of the two. In order to explicitly specify the interchangeability of hardware and software, components and steps of each example have been generally described according to functions in the above description. Whether these functions are performed by means of hardware or software depends on particular applications and design constraints for the technical solutions. Professionals can use different methods for each particular application to achieve the described function, but such implementation should not be deemed as going beyond the scope of the present disclosure.

The method and algorithm steps according to the embodiments of the present disclosure may be implemented through hardware, software module executed by a processor, or combination of the hardware and the software module executed by the processor. The software module may be placed in random access memory (RAM), memory, read-only memory (ROM), electrically programmable ROM, electrically erasable programmable ROM, register, hard disk, removable disk, CD-ROM, or any other forms of storage medium known in the technical field.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A processing method, comprising:
   continuously acquiring an image by using an acquisition component and continuously displaying the acquired image by using a display device in response to a first operation; and
   storing one or more frames of the image by using a storage device in response to a second operation;
   wherein:
   after the first operation and before storing the one or more frames of the image, there is at least one moment that a first light-emitting component is in an illuminating state and the moment of the first light-emitting component being in the illuminating state is different from a moment that the one or more frames of the image are acquired; and
   the method further comprises:
      before the first operation, in response to a third operation, triggering the first light-emitting component to be in the illuminating state;
   wherein the first light-emitting component is in the illuminating state continuously, after the first operation and before storing the one or more frames of the image, during the first operation and the second operation, the first light-emitting component is used as a flash to fill light by an imaging application, and during the third operation, the first light-emitting component is used as a flashlight by a flashlight application.

2. The method of claim 1, wherein:
   after the first operation and before storing the one or more frames of the image, the first light-emitting component in the illuminating state provides light for use in one or more of a first mode and a second mode; and
   the first mode and the second mode have different uses of light; or,
   a triggering moment or a triggering operation by the first mode and the second mode are different.

3. The method of claim 1, further comprising:
   after acquiring the one or more frames of the image, stopping: acquiring the image by using the acquisition unit and displaying the acquired image by using the display device, or continuing: continuously acquiring the image by using the acquisition component and continuously displaying the acquired image using the display device.

4. The method of claim 1, wherein the first light-emitting component is in the illuminating state at the moment that the one or more frames of the image are acquired; or the first light-emitting component is not in the illuminating state at the moment that the one or more frames of the image are acquired.

5. The method of claim 1, wherein the method is applied to a first device, the first device includes the first light-emitting component; and light of the first light-emitting component in the illuminating state is used to trigger a second light-emitting component of a second device to be in an illuminating state at the moment that the one or more frames of the image are acquired.

6. The method of claim 5, further comprising:
   triggering the second light-emitting component to be in the illuminating state before the one or more frames of the image are acquired.

7. The method of claim 5, wherein the light of the first light-emitting component in the illuminating state is further used to trigger the second light-emitting component to be in the illuminating state with a target illuminating parameter.

8. A processing apparatus, comprising:
   an image acquisition component configured to continuously acquire an image by using an acquisition component and continuously displaying the acquired image by using a display unit in response to a first operation;
   an image storage device configured to store one or more frames of the image by using a storage device in response to a second operation; and
   an illumination trigger device configured to trigger the first light-emitting component to be in the illuminating state before the first operation in response to a third operation;
   wherein:
   after the first operation and before storing the one or more frames of the image, there is at least one moment that a first light-emitting component is in an illuminating state and the moment of the first light-emitting component being in the illuminating state is different from a moment that the one or more frames of the image are acquired;
   the first light-emitting component continues to be in the illuminating state after the first operation and before storing the one or more frames of the image; and
   during the first operation and the second operation, the first light-emitting component is used as a flash to fill light by an imaging application, and during the third operation, the first light-emitting component is used as a flashlight by a flashlight application.

9. The processing apparatus of claim 8, further comprising:
   after the first operation and before storing the one or more frames of the image, the first light-emitting component in the illuminating state provides light for use in one or more of a first mode and a second mode; and
   the first mode and the second mode have different uses of light; or,
   a triggering moment or a triggering operation by the first mode and the second mode are different.

10. The processing apparatus of claim 8, wherein after acquiring the one or more frames of the image, stop: acquiring the image by using the acquisition component and displaying the acquired image by using the display device, or continue: continuously acquiring the image by using the acquisition component and continuously displaying the acquired image using the display device.

11. The processing apparatus of claim 8, wherein the first light-emitting component is in the illuminating state at the moment that the one or more frames of the image are acquired; or the first light-emitting component is not in the illuminating state at the moment that the one or more frames of the image are acquired.

12. The processing apparatus of claim 8, further comprising:
a cooperative triggering device configured to trigger a second light-emitting component to be in an illuminating state before the one or more frames of the image are acquired.

13. An electronic device, comprising:
an acquisition component, configured to continuously acquire an image in response to a first operation;
a display device, configured to continuously display the image acquired by the acquisition component;
a storage device, configured to store one or more frames of the image in response to a second operation; and
a first light-emitting component configured at least in one moment to be in an illuminating state after the first operation and before storing the one or more frames of the image, and the moment of the first light-emitting component being in the illuminating state is different from a moment that the one or more frames of the image are acquired,
wherein:
before the first operation, the first light-emitting component is triggered to be in the illuminating state in response to a third operation; and the first light-emitting component continues to be in the illuminating state after the first operation and before storing the one or more frames of the image; and
during the first operation and the second operation, the first light-emitting component is used as a flash to fill light by an imaging application, and during the third operation, the first light-emitting component is used as a flashlight by a flashlight application.

14. The electronic device of claim 13, wherein:
after the first operation and before storing the one or more frames of the image, the first light-emitting component in the illuminating state provides light for use in one or more of a first mode and a second mode; and
the first mode and the second mode have different uses of light; or,
a triggering moment or a triggering operation by the first mode and the second mode are different.

15. The electronic device of claim 13, wherein after acquiring the one or more frames of the image, stop: acquiring the image by using the acquisition component and displaying the acquired image by using the display device, or continue: continuously acquiring the image by using the acquisition component and continuously displaying the acquired image using the display device.

16. The electronic device of claim 13, wherein the first light-emitting component is in the illuminating state at the moment that the one or more frames of the image are acquired; or the first light-emitting component is not in the illuminating state at the moment that the one or more frames of the image are acquired.

* * * * *